(12) United States Patent
Garcés-Erice

(10) Patent No.: US 10,567,496 B2
(45) Date of Patent: Feb. 18, 2020

(54) EFFICIENT MAINTENANCE OF A DISTRIBUTED SYSTEM MEMBERSHIP VIEW

(71) Applicant: International Business Machines Corporation, Armonk, NY (US)

(72) Inventor: Luis Garcés-Erice, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 15/685,218

(22) Filed: Aug. 24, 2017

(65) Prior Publication Data

US 2017/0353547 A1  Dec. 7, 2017

Related U.S. Application Data

(63) Continuation of application No. 15/455,743, filed on Mar. 10, 2017, now Pat. No. 9,769,257, which is a continuation of application No. 15/239,326, filed on Aug. 17, 2016, now Pat. No. 9,609,055, which is a continuation of application No. 13/907,247, filed on May 31, 2013, now Pat. No. 9,442,882, which is a
(Continued)

(51) Int. Cl.
| | |
|---|---|
| G06F 15/16 | (2006.01) |
| H04L 29/08 | (2006.01) |
| H04W 4/08 | (2009.01) |
| G06Q 30/02 | (2012.01) |
| H04W 8/18 | (2009.01) |
| G06F 15/173 | (2006.01) |
| G06F 15/163 | (2006.01) |

(52) U.S. Cl.
CPC ........ *H04L 67/1046* (2013.01); *G06F 15/163* (2013.01); *G06F 15/173* (2013.01); *G06Q 30/02* (2013.01); *H04L 67/1053* (2013.01); *H04L 67/16* (2013.01); *H04W 4/08* (2013.01); *H04W 8/186* (2013.01)

(58) Field of Classification Search
CPC . H04L 67/1046; H04L 67/16; H04L 67/1053; H04W 4/08; H04W 8/186; G06Q 30/02; G06F 15/163; G06F 15/173
See application file for complete search history.

(56) References Cited

U.S. PATENT DOCUMENTS

| | | |
|---|---|---|
| 6,411,964 B1 * | 6/2002 | Iyer .................... G06F 16/2282 |
| 6,748,438 B2 | 6/2004 | Palmer et al. |
| 7,107,313 B2 | 9/2006 | Fleming |

(Continued)

*Primary Examiner* — Richard G Keehn
(74) *Attorney, Agent, or Firm* — Scully, Scott, Murphy & Presser, P.C.; Daniel Morris, Esq.

(57) ABSTRACT

A method, system and computer program product are disclosed for maintaining a membership view of a distributed computing system comprising a multitude of members, wherein each of said members sends out a message indicating that said each of the members is available in the system. In one embodiment, the method comprises maintaining a first list of at least some of the members in the distributed system; and over a period of time, when one of the members sends out the message indicating that said one of the members is available in the distributed system, adding said one of the members to a second list. At defined times, the first list is replaced with the second list. In an embodiment, the method further comprises at said defined times, starting a new, empty second list.

20 Claims, 3 Drawing Sheets

Related U.S. Application Data continuation of application No. 12/372,062, filed on Feb. 17, 2009, now Pat. No. 8,495,141.

(56) References Cited

U.S. PATENT DOCUMENTS

| | | | | |
|---|---|---|---|---|
| 7,280,536 B2* | 10/2007 | Testardi | ............... | G06F 3/0611 370/353 |
| 7,738,912 B1* | 6/2010 | Hawkins | ......... | H04M 1/274558 455/550.1 |
| 7,853,656 B2* | 12/2010 | Yach | .............. | G06Q 10/109 709/206 |
| 7,945,272 B2* | 5/2011 | Kim | ............... | H04W 4/02 455/456.1 |
| 2002/0143743 A1* | 10/2002 | Iyer | ............... | G06F 16/2282 |
| 2002/0178038 A1* | 11/2002 | Grybas | .............. | G06Q 10/10 705/326 |
| 2003/0037103 A1* | 2/2003 | Salmi | ............ | G06F 21/6245 709/203 |
| 2003/0133692 A1* | 7/2003 | Hunter | ................ | H04N 7/165 386/213 |
| 2004/0003111 A1* | 1/2004 | Maeda | ................ | H04L 45/02 709/237 |
| 2004/0234045 A1* | 11/2004 | Hora | ............... | G06Q 10/10 379/88.13 |
| 2005/0054289 A1* | 3/2005 | Salazar | ................ | H04W 92/02 455/39 |
| 2005/0097046 A1* | 5/2005 | Singfield | ............ | G06Q 20/042 705/42 |
| 2005/0144483 A1* | 6/2005 | Robertson | ............. | G06Q 10/02 726/4 |
| 2006/0063548 A1* | 3/2006 | Kim | ................ | H04W 4/02 455/518 |
| 2006/0067499 A1* | 3/2006 | Oliveira | ............ | H04M 3/56 379/202.01 |
| 2006/0168202 A1* | 7/2006 | Reshef | ................ | G06Q 10/107 709/224 |
| 2006/0253782 A1* | 11/2006 | Stark | ................ | G11B 27/031 715/727 |
| 2006/0253874 A1* | 11/2006 | Stark | ................ | G06F 3/038 725/62 |
| 2007/0041338 A1* | 2/2007 | Rowe | ................ | H04Q 11/04 370/261 |
| 2007/0115868 A1* | 5/2007 | Chen | ................ | G08G 1/163 370/315 |
| 2007/0143281 A1* | 6/2007 | Smirin | ............. | G06F 16/9535 |
| 2007/0198589 A1* | 8/2007 | Houri | ................ | H04L 67/24 |
| 2007/0214505 A1* | 9/2007 | Stavrou | ............. | G06F 21/55 726/24 |
| 2007/0291772 A1 | 12/2007 | Andersson et al. | | |
| 2008/0228887 A1* | 9/2008 | Robertson | ............. | G06Q 10/02 709/206 |
| 2009/0018893 A1* | 1/2009 | Aviv | ................ | G06Q 30/02 705/7.32 |
| 2009/0083117 A1* | 3/2009 | Svendsen | ............ | H04L 67/30 709/205 |
| 2009/0182618 A1* | 7/2009 | Higgins | ................ | G06Q 30/02 705/14.4 |
| 2009/0276466 A1* | 11/2009 | Blohm | ................ | G06Q 30/02 |
| 2009/0287559 A1* | 11/2009 | Chen | ................ | G06Q 30/0222 705/14.23 |
| 2010/0057562 A1* | 3/2010 | Gabbay | ................ | G06Q 30/02 705/14.52 |
| 2010/0121472 A1* | 5/2010 | Babu | ................ | B23K 9/02 700/104 |
| 2011/0044322 A1* | 2/2011 | Deng | ................ | H04M 7/1205 370/352 |

* cited by examiner

EFFICIENT MAINTENANCE OF A DISTRIBUTED SYSTEM MEMBERSHIP VIEW

CROSS REFERENCE TO RELATED APPLICATIONS

This application is a continuation of copending U.S. patent application Ser. No. 15/455,743, filed Mar. 10, 2017, which is a continuation of U.S. patent application Ser. No. 15/239,326, filed Aug. 17, 2016, which is a continuation of U.S. patent application Ser. No. 13/907,247, filed May 31, 2013, which is a continuation of U.S. patent application Ser. No. 12/372,062, filed Feb. 17, 2009. The entire contents and disclosures of U.S. patent application Ser. Nos. 15/455,743, 15/239,326, 13/907,247 and 12/372,062 are hereby incorporated herein by reference in their entireties.

BACKGROUND OF THE INVENTION

Field of the Invention

The present invention generally relates to distributed computing systems, and more specifically, to maintenance of a distributed system membership view.

Background Art

Distributed computing systems are complex aggregations of members or units that communicate with each other through an interconnect in order to achieve some common goal. A distributed system may comprise multiple individual processors linked in a network, or a plurality of software processes or threads operating concurrently in a coordinated environment. In a network configuration, the processors communicate with each other through a network that supports a network protocol. This protocol may be implemented using a combination of hardware and software components. In a coordinated software environment, the software processes are logically connected together through some communication medium such as an Ethernet network. Whether implemented in hardware, software, or a combination of both, the individual elements of the network are referred to individually as members, and together as a group.

A robust distributed system must take into account the fact that its forming members may fail or become inaccessible at any time, while the system still needs to continue working by using the members available. Typically, each process in a distributed system maintains information, which may be updated, regarding the configuration of the system as a whole. To this purpose, processes often maintain a "view," which is a data structure representing the membership of the distributed system (i.e., a set of processes that constitute the system, and each process in the view is a member).

A soft-state protocol for the membership of a distributed system is one in which the available members are not hard-coded and known in advance when the system is initialized. Rather, the members themselves make known their presence and location to the others by means of sending a message containing this information through the interconnect, so that each member discovers the available members at some point in time. Furthermore, each member periodically resends this message every time period T so that others know that the originating member is still available. Each member is interested in knowing the other members availability at some point in time, so that they can work together to achieve whatever function the distributed system is aimed at. In order to do that, each member maintains a view of the current membership of the distributed system, formed by the locations and identities in the messages received from other members.

New arriving members are added to this view when their messages are received. But members that are not available anymore should be taken out of the view. Otherwise the view would not be consistent with the members actually available; and in the long term, the view would grow without limit (as members may leave the system and integrate into it again later with a different location or identity), uselessly consuming resources at each member. However, even if messages are sent periodically, a member cannot state that another is not anymore part of the system just because a message has not arrived for one period of time T: the message may have been lost in the interconnect, or the member may be sending messages too slowly due to a high load of processing in that member at that time. An explicit message from a member telling that it is about to leave the system would not solve the problem, as we have to consider the case where the member does not work properly anymore, or cannot contact the others through the interconnect.

In a typical implementation, the maintenance of the view is implemented as follows. When a message from a member arrives, the identity of the member sending the message is stored in the view together with the time of reception of the message. Periodically, with a given period T, it is verified for every member that the reception of its last message has not occurred more than a given limit number (possibly fractional) of periods ago. If, for a given member, the limit is exceeded, the member is finally considered not to be part of the distributed system. This method requires checking every single member in the view at each period, which is inefficient and may be prohibitively costly in low resource members (such as sensors) or in systems with a very large membership (such as Peer-to-peer networks).

SUMMARY OF THE INVENTION

Embodiments of the invention provide a method, system and computer program product for maintaining a membership view of a distributed computing system comprising a multitude of members or units, where each of said members sends out a message indicating that said each of the members is available in the computing system. In one embodiment, the method comprises maintaining a first list of at least some of the members in the distributed system; and over a period of time, when one of the members sends out the message indicating that said one of the members is available in the distributed system, adding said one of the members to a second list. In this method, at defined times, the first list is replaced with the second list.

In an embodiment, the method further comprises at said defined times, starting a new, empty second list; and when one of the members sends out the message indicating that said one of the members is available in the system, adding said one of the members to the first list. In an embodiment, the method may be used with a soft-state protocol for the membership of the distributed system. In such a distributed system, when the system is initialized, the members in the system do not know which of the members are available in the system.

Embodiments of the invention address the fundamental problem of an application being able to detect as quickly as possible changes in the distributed system. Also, embodiments of the invention are well suited for use with soft-state membership maintenance protocols for distributed systems, and are well suited for scaling to a very large number of members.

Further benefits and features of this invention will become apparent from a consideration of the following detailed description, given with reference to the accompanying drawings, which specify and show embodiments of the invention.

DETAILED DESCRIPTION OF THE PREFERRED EMBODIMENTS

Figure 1:
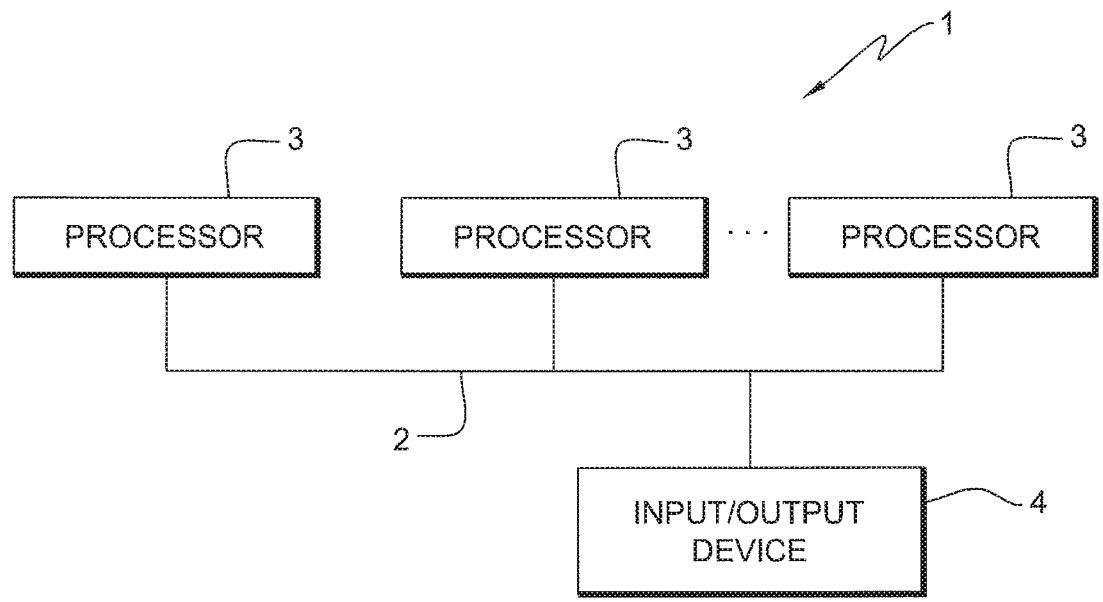
FIG. 1 is a block diagram of a distributed computing system in which embodiments of the present invention may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows a simplified block diagram of a distributed computing system 1 in which embodiments of the invention may be practiced. The "distributed" nature of the system 1 means that physically or logically separate processing elements cooperative to perform a single task. These elements may be physically co-located or remote from each other, depending upon the requirements of the application. In the illustrated example, the foregoing processing elements comprise a plurality of processors 3 connected to a communication interface 2. These processors, also called "nodes", "members", or "participants", communicate with each other by sending and receiving messages or packets over the communication interface 2.

An input/output device 4 schematically represents any suitable apparatus attached to the interface 2 for providing input to the distributed system 1 and receiving output from the system. Alternatively, device 4 may be attached to one of the processors 3. Examples of device 4 are display terminals, printers, and data storage devices.

It will be understood that various configurations of distributed data processing systems known to a person of ordinary skill in the art may be used for practicing embodiments of the invention. Such systems include broadcast networks, such as token-ring networks, distributed database systems and operating systems which are comprised of autonomous instances of software.

In an exemplary embodiment, each of the processors 3 may comprise a hardware component such as a personal computer, workstation, server, mainframe computer, microprocessor, or other digital data processing machine. These processors 3 may be physically distributed, or not, depending upon the requirements of the particular application. Alternatively, the processors 3 may comprise software modules, processes, threads, or another computer-implemented task. Whether implemented in hardware, software, or a combination of hardware/software, the processors 3 preferably operate concurrently to perform tasks of the system 1.

Figure 2:
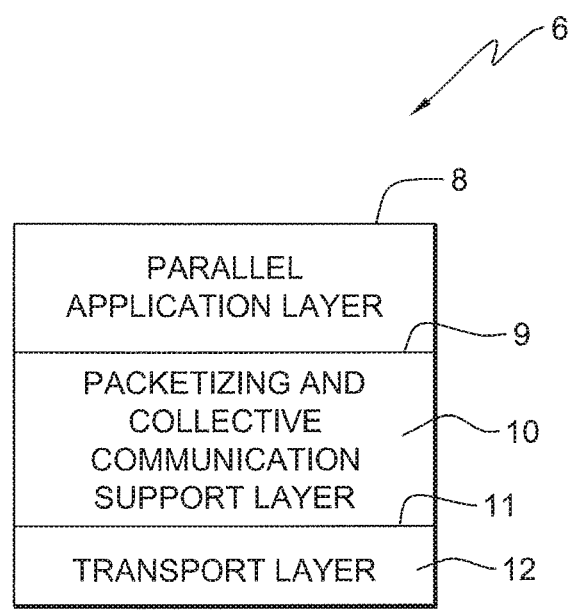
FIG. 2 shows a software instance with which embodiments of the present invention may be applied.

FIG. 2 illustrates the structure of a software instance 6 typical of the ones operating in the distributed computing system 1. Generally, each instance 6 has several software layers: a parallel application layer 8, a packetizing and collective communication support layer 10, and a transport layer 12. The parallel application layer 8 communicates with the packetizing and collective communication support layer 10 by making collective calls at a message interface 9. The message interface 9 is located between layers 8 and 10. An example of the message interface 9 is provided in the industry standard Message Passing Interface (MPI). The packetizing and collective communication support layer 10 communicates with the transport layer 12 by sending and receiving packets through a packet interface 11. To process an application in the distributed system 1, the application layers 8 of software instances 6 operate in parallel to execute the application.

As mentioned above, a robust distributed system must take into account that its forming members may fail or become inaccessible at any time, while the system still needs to continue working by using the members that are available. In order to do this, each member maintains a view of the current membership of the distributed system, formed by the locations and identities in the messages received from other members.

Embodiments of this invention comprise methods, systems and computer program products to maintain efficiently a member's view of the members available in a distributed system, without changing the way existing soft-state protocols work.

Figure 3:
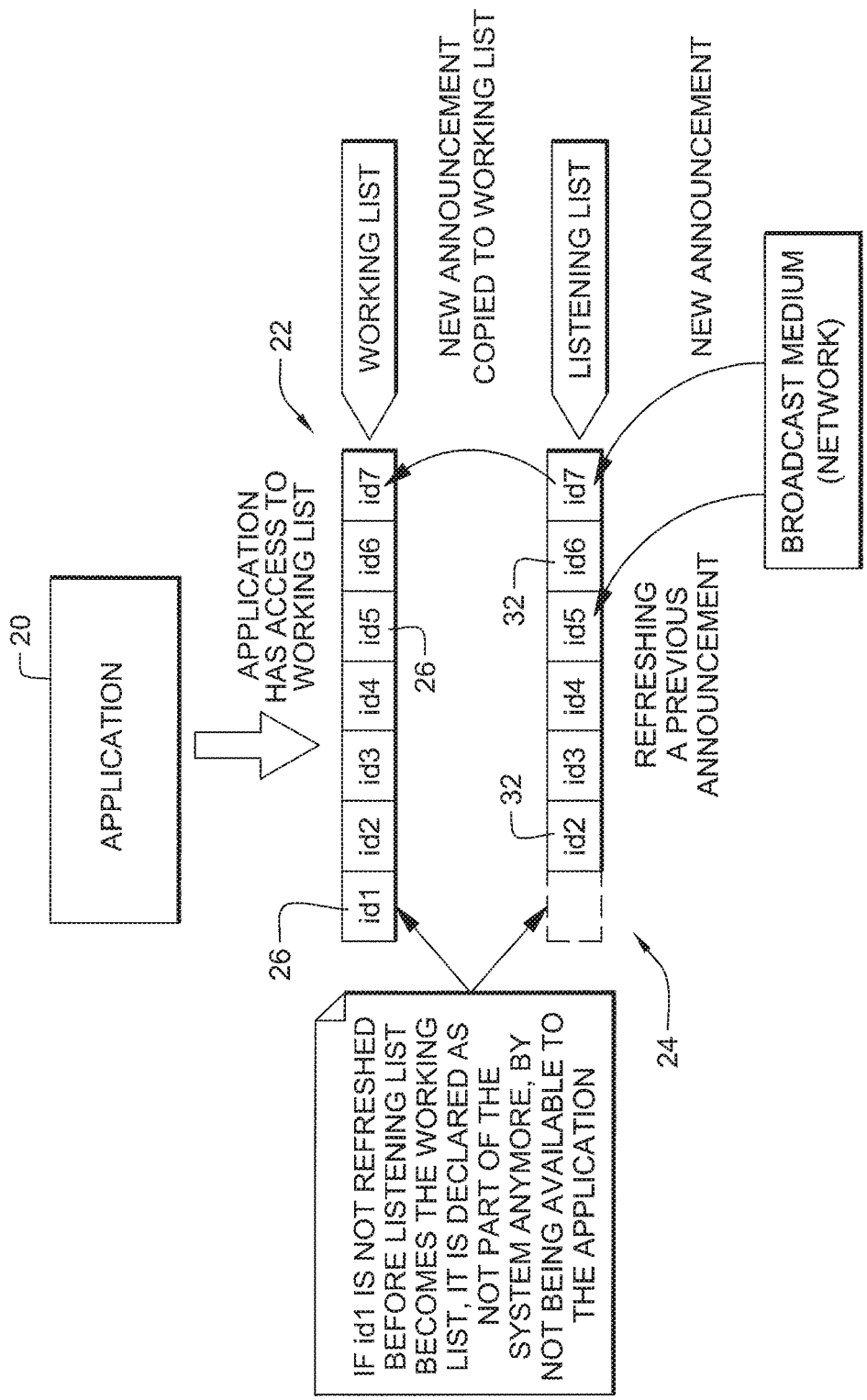
FIG. 3 illustrates a mechanism for maintaining a distributed system membership view in accordance with embodiments of this invention.

With reference to FIG. 3, in accordance with embodiments of this invention, instead of the view being comprised of a single list of available members in the system, there are two lists, referred to as working list 22 and listening list 24. The working list includes a list of member ids, represented at 26, and is the view of the system as the application 30 running on the distributed systems perceives it at any point in time. The listening list also includes a list of member ids, represented at 32, and is a view comprised of the members (their location and identity) corresponding to the messages that arrive to the member.

Whenever a new member is added to the listening list, it is immediately added to the working list, as represented at 34. If the member corresponding to a received message is present in the listening list, the working list remains unchanged. Periodically, with a period equal to a number (possibly fractional) of times the period T of the messages sent by the members, the working list is discarded, the listening list becomes the new working list, and an empty listening list is set up.

In one embodiment, T is greater than $T_o$ to allow for messages to be lost. If T is, for example, three times as long as $T_o$, then up to two messages can be lost, but the third message will ensure that the second list contains the unit sending those messages (and so will the first list, which is the list used by the applications, when substituted by the second).

Through this procedure, the working list—that is, the view of the system that the application is using—remains up to date with all the members in the distributed system that have shown activity—that is, that are available. With this procedure, the working list is updated without having to perform any verification over the list, in an operation whose computation does not depend on the number of members present in the system (simply replacing the working list with the listening list, and making the listening list a new, empty list).

Figure 4:
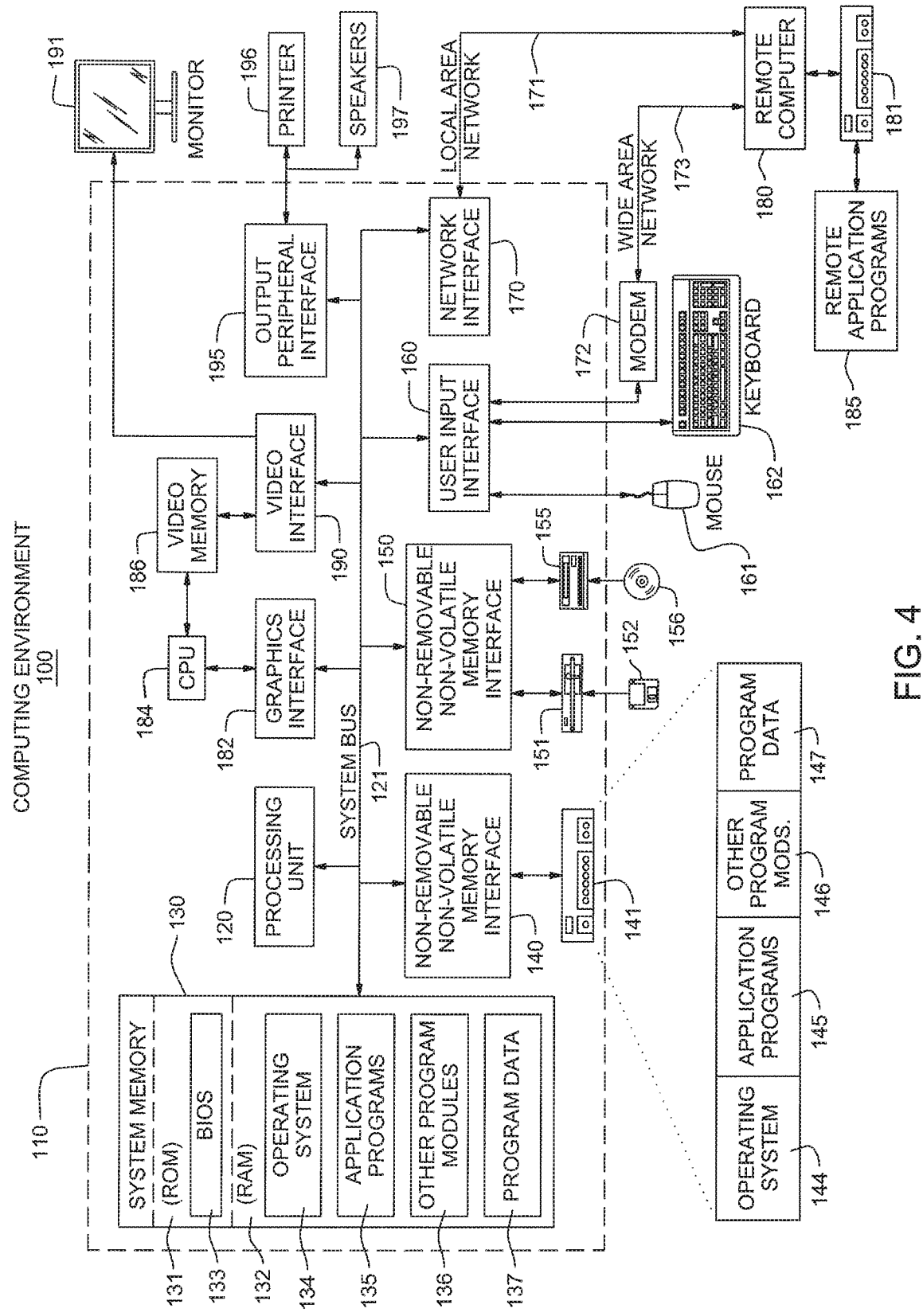
FIG. 4 illustrates a computing environment which may be used in the practice of this invention.

For example, FIG. 4 and the following discussion provide a brief general description of a suitable computing environment in which the invention may be implemented. While a general-purpose computer is described below, this is but one example, the present invention may be implemented in an environment of networked hosted services in which very little or minimal client resources are implicated, e.g., a networked environment in which the client device serves merely as a browser or interface to the World Wide Web. It should also be understood that handheld, portable, and other computing devices of all kinds are contemplated for use in connection with the present invention.

Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations.

Other well known computing systems, environments, and/or configurations that may be suitable for use with the invention include, but are not limited to, personal computers (PCs), server computers, hand-held or laptop devices, multiprocessor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 4, thus, illustrates an example of a suitable computing system environment 100 which may be used in the implementation of this invention, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 4, an exemplary system 100 includes a general purpose-computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 134, other program modules 136, and program data 137.

The computer 110 may also include other removable/non-removable, volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4 provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host-processing unit 120, and assumes responsibility for accelerated graphics port (AGP) communications. One or more graphics processing units (GPUs) 684 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 691, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a stand-alone computing device, having programming language functionality, interpretation and execution capabilities.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of using a listening list to determine updates to a working list of a membership view of members of a distributed computing system, wherein, the working list comprises a list of current members of the distributed computing system; during a given period of time, each of one or more of said current member of the computing system generates a membership signal to indicate that said each current member is a member of the computing system; and during the given period of time, new members join the distributed computing system, and each of the new members generates the membership signal to indicate that said each new member is active in the distributed computing system, the method comprising:
    maintaining the working list of a membership view of members of the distributed computing system;
    maintaining a listening list to list the members of the distributed computing system; and
    during a defined period of time, monitoring for the membership signals; and
    whenever one of the membership signals is detected,
        determining if the one of the members that generated the detected membership signal is on the listening list,
        if said one of the members is on the listening list, keeping the working list unchanged, and
        if said one of the members is not on the listening list, adding said one of the members to the listening list and to the working list.

2. The method according to claim 1, further comprising at a specified time, replacing the working list with the listening list to form a new working list.

3. The method according to claim 2, wherein the new working list identifies those members of the computing system that generated the membership signal during the given period of time.

4. The method according to claim 2, further comprising starting a new, empty listening list at the specified time.

5. The method according to claim 2, wherein the maintaining a listening list includes during the given period of time, adding to the listening list only the members of the computing system that generated the memberships signal during the given period of time.

6. The method according to claim 5, wherein the replacing the working list with the listening list to form a new working list includes replacing the working list with the listening list to form a new working list identifying only those members of the computing system that, during the given time period, generated the membership signal.

7. The method according to claim 2, wherein said specified time is at the end of the given period of time.

8. The method according to claim 1, wherein each of the members in the computing system generates the membership signal in a defined time period, and the given time period is longer than the defined time period.

9. The method according to claim 8, wherein the given time period is three times as long as the defined time period.

10. The method according to claim 1, wherein over said given period of time, the listening list becomes an updated, complete list of all the members in the distributed computing system that, during said given time period, generated the membership signal.

11. A membership updating system for using a listening list to determine updates to a working list of a membership view of members of a distributed computing system, wherein, the working list comprises a list of current members of the distributed computing system; during a given period of time, each of one or more of said current member of the computing system generates a membership signal to indicate that said each current member is a member of the computing system; and during the given period of time, new members join the distributed computing system, and each of the new members generates the membership signal to indicate that said each new member is active in the distributed computing system, the membership updating system comprising:
    a computer system comprising a memory for storing data, and one or more hardware processor units connected to the memory for transmitting data to and receiving data from the memory, the one or more hardware processor units configured for:
        maintaining the working list of a membership view of members of the distributed computing system;
        maintaining a listening list to list the members of the distributed computing system; and
        during a defined period of time, monitoring for the membership signals; and whenever one of the membership signals is detected,
            determining if the one of the members that generated the detected membership signal is on the listening list,
            if said one of the members is on the listening list, keeping the working list unchanged, and if said one of the members is not on the listening list, adding said one of the members to the listening list and to the working list.

12. The membership updating system according to claim 11, wherein the one or more hardware processor units are configured for replacing the working list with the listening list at a specified time to form a new working list.

13. The membership updating system according to claim 12, wherein the new working list identifies those members of the computing system that generated the membership signal during the given period of time.

14. The membership updating system according to claim 12, wherein the one or more hardware processor units are configured for starting a new, empty listening list at the specified time.

15. The membership updating system according to claim 12, wherein the maintaining a listening list includes during the given period of time, adding to the listening list only the members of the computing system that generated the memberships signal during the given period of time.

16. An article of manufacture comprising:
at least one computer usable device having computer readable program code logic to execute a machine instruction in a processing member for keeping current a working list of a membership view of members of a distributed computing system, wherein, the working list comprises a list of current members of the distributed computing system; during a given period of time, each of one or more said current member of the computing system generates a membership signal to indicate that said each current member is a member of the computing system; and during the given period of time, new members join the distributed computing system, and each of the new members generates the membership signal to indicate that said each new member is active in the distributed computing system, the computer readable program code logic, when executing, performing the following:
maintaining the working list of a membership view of members of the distributed computing system;
maintaining a listening list to list the members of the distributed computing system; and
during a defined period of time, monitoring for the membership signals; and whenever one of the membership signals is detected,
determining if the one of the members that generated the detected membership signal is on the listening list,
if said one of the members is on the listening list, keeping the working list unchanged, and
if said one of the members is not on the listening list, adding said one of the members to the listening list and to the working list.

17. The article of manufacture according to claim 16, wherein the computer readable program code logic, when executing, performs the following: at a specified time, replacing the working list with the listening list to form a new working list.

18. The article of manufacture according to claim 17, wherein the new working list identifies those members of the computing system that generated the membership signal during the given period of time.

19. The article of manufacture according to claim 17, wherein the computer readable program code logic, when executing, performs the following: starting a new, empty listening list at the specified time.

20. The article of manufacture according to claim 17, wherein the maintaining a listening list includes during the given period of time, adding to the listening list only the members of the computing system that generated the memberships signal during the given period of time.

* * * * *